US008573625B2

(12) United States Patent
Gramme (10) Patent No.: US 8,573,625 B2
(45) Date of Patent: Nov. 5, 2013

(54) BUDDY TOW AND GO

(76) Inventor: Ronald P. Gramme, Aurora, IL (US)

( * ) Notice: Subject to any disclaimer, the term of this patent is extended or adjusted under 35 U.S.C. 154(b) by 46 days.

(21) Appl. No.: 13/358,162

(22) Filed: Jan. 25, 2012

(65) Prior Publication Data

US 2012/0187655 A1 Jul. 26, 2012

Related U.S. Application Data

(60) Provisional application No. 61/436,348, filed on Jan. 26, 2011.

(51) Int. Cl.
*B62D 63/06* (2006.01)
*B62D 47/00* (2006.01)

(52) U.S. Cl.
USPC ..................... 280/401; 280/204; 280/250.1

(58) Field of Classification Search
USPC ............... 280/204, 304.1, 292, 304.5, 288.4, 280/250.1, 33.992, 442
See application file for complete search history.

(56) References Cited

U.S. PATENT DOCUMENTS

| | | | | |
|---|---|---|---|---|
| 4,096,920 | A | * | 6/1978 | Heyn ............................. 180/11 |
| 4,221,276 | A | | 9/1980 | Mitchell et al. |
| 5,064,209 | A | | 11/1991 | Kurschat |
| 5,794,957 | A | | 8/1998 | Mendon |
| 5,816,349 | A | | 10/1998 | Hankins |
| 5,927,730 | A | | 7/1999 | Sattler |
| 6,000,705 | A | * | 12/1999 | Velke .......................... 280/32.7 |
| D434,701 | S | | 12/2000 | Patmont |
| 6,186,528 | B1 | | 2/2001 | Walker, Sr. et al. |
| 6,305,703 | B1 | | 10/2001 | Quick et al. |
| 6,725,955 | B2 | | 4/2004 | Bidwell |
| 6,893,030 | B2 | * | 5/2005 | Shapiro ...................... 280/47.34 |
| 6,994,362 | B2 | * | 2/2006 | Foster .......................... 280/163 |
| 8,006,786 | B1 | * | 8/2011 | Chapman .................... 180/65.1 |

* cited by examiner

*Primary Examiner* — Tony Winner
*Assistant Examiner* — Jacob Knutson
(74) *Attorney, Agent, or Firm* — Buckingham, Doolittle & Burroughs, LLP (57) ABSTRACT

An architecture is presented that provides a riding platform device attachable to the back of a personal assistive mobility device, and more particularly to a removable and adjustable platform device for attachment to an electric or gas powered scooter that allows a companion to be transported along with the scooter and its driver, and thereby keep pace with an individual with limited mobility.

4 Claims, 6 Drawing Sheets

BUDDY TOW AND GO

CROSS-REFERENCE

This application claims priority from Provisional Patent Application Ser. No. 61/436,348 filed Jan. 26, 2011.

FIELD OF THE INVENTION

This invention pertains generally to a platform comprising a hitch and wheels for attachment to the back of a power scooter, and more particularly to a removable and adjustable platform device for attachment to an electric or gas powered scooter that allows a companion to be conveyed by the scooter, and thereby keep pace with an individual driving the power scooter.

BACKGROUND

Many people, some of whom may be handicapped, choose to use electric scooters or other mobility devices, so that they may get around quickly and conveniently with little effort. However, this may pose problems for their partners, caregivers, or family members, who may struggle to keep pace with their loved ones while the scooters are in use. Additionally, those individuals may have exceptional difficulty keeping up with the scooters due to various physical or health conditions of their own. Powered personal mobility transportation devices are costly and may not be affordable to a companion who must keep pace with the mobility device.

Consequently, there is a need for an easy and safe way for a companion to keep up with a user of a personal assistive mobility device. The present invention discloses a platform device for use with a personal assistive mobility device. The platform device is easily attachable to most personal assistive mobility devices such as scooters or electric wheelchairs so that a user can be transported by the personal mobility device along with a driver. The platform device allows a user an economical alternative so that the user may easily keep pace with a disabled or elderly companion using a personal assistive mobility device while conserving energy.

SUMMARY

Accordingly, the present invention overcomes the limitations of the prior art by providing a unique and useful platform device that is attachable to a personal assistive mobility device, thereby allowing a companion to be transported by the personal assistive mobility device along with a driver.

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a platform device for use with a personal assistive mobility device. The platform device comprises a frame assembly and a platform assembly. The frame assembly is selectively attachable and adjustable to the personal assistive mobility device to accommodate different types and sizes of the personal assistive mobility device. Additionally, the frame assembly is adjustable to fit the height and size of a rider.

Furthermore in the preferred embodiment of the invention, the frame assembly adjustably attaches to a rear portion of the personal assistive mobility device. The platform assembly may unhook and articulate from a substantially vertical storage position to a substantially horizontal riding position. The rider may then step onto the platform assembly for transport. The frame assembly further comprises a handle component for the companion to grasp that provides additional stability while the platform device is in motion.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The present invention discloses a platform device for use with a personally assistive mobility device such as an electric scooter. The preferred embodiment allows a companion of a user of the electric scooter to remain in close proximity to the user with little effort. The platform device is selectively attachable to the scooter. The platform device comprises a frame assembly pivotally and articulateably connected to a platform assembly. Once the platform device is attached to the scooter, the companion simply steps onto the platform assembly and holds onto a handle element for stability. Once no longer needed, the platform assembly may fold up and attach to the frame assembly for convenient compact storage without the need to detach the platform device from the scooter.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
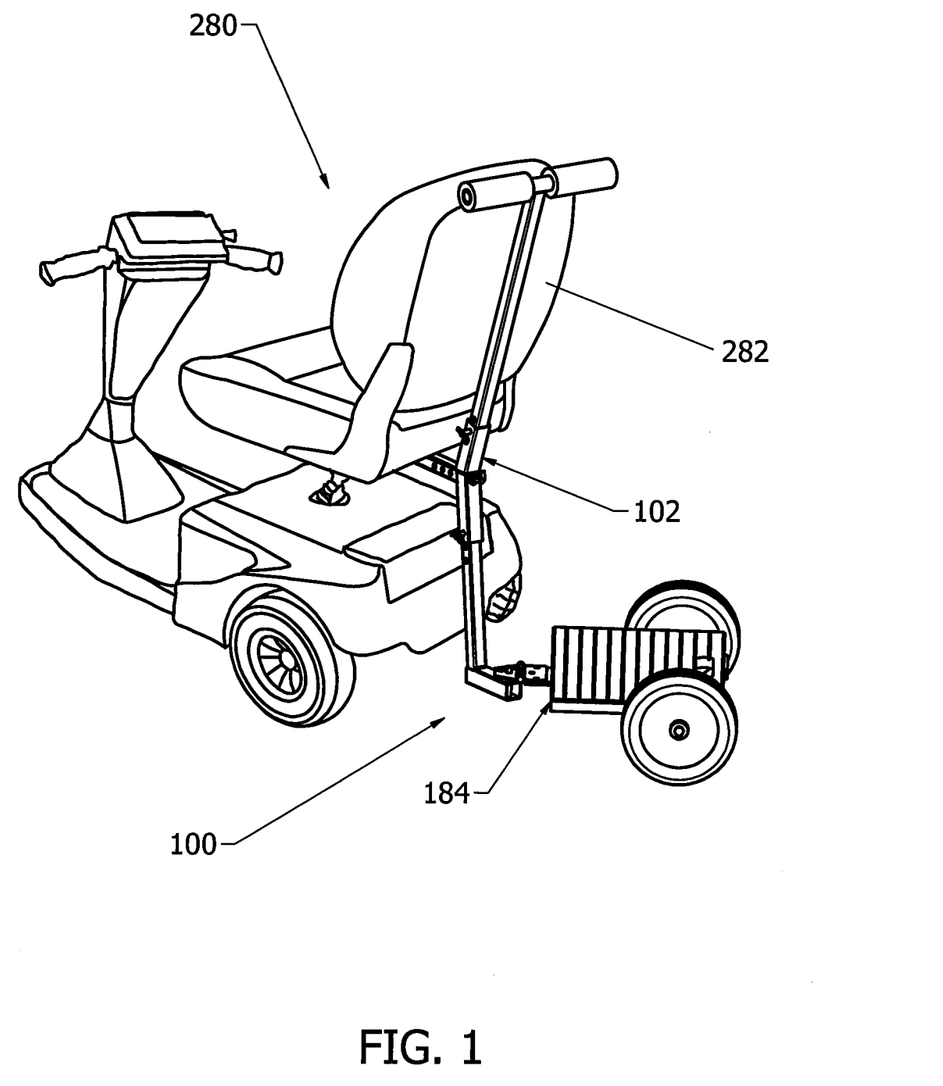
FIG. 1 illustrates a perspective view of a platform device in conjunction with a personal assistive mobility device in accordance with the disclosed architecture.

Referring initially to the drawings, FIG. 1 illustrates a platform device 100 for use with a personal assistive mobility device 280. The personal assistive mobility device 280 is typically an electric scooter, though it is contemplated that the personal assistive mobility device 280 may comprise other transportation devices, such as but not limited to a gas powered scooter, an electric wheelchair, a power chair, and the like without affecting the overall concept of the present invention. The personal assistive mobility device 280 further comprises a rear end portion 282 to which the platform device 100 may attach as discussed infra.

The platform device 100 comprises a frame assembly 102 and a platform assembly 184. The platform assembly 184 is connected to the frame assembly 102 so that the platform assembly 184 may fold up and attach to the frame assembly 102 when not in use. Therefore, a user need not disassemble or otherwise remove the platform device 100 from the personal assistive mobility device 280 when not in use. When in use, the platform assembly 184 can follow the personal assistive mobility device 280 substantially anywhere the personal assistive mobility device 280 may travel, such as through a store for example. Additionally, the platform device 100 is easily transportable while attached to the powered personal assistive mobility device 280 by methods comprising: public transportation, elevator, boat, train, monorail, bus, van, truck, and the like without detachment. In other words, when folded up, the platform device 100 does not substantially add to the size of the personal assistive mobility device 280.

Figure 2:
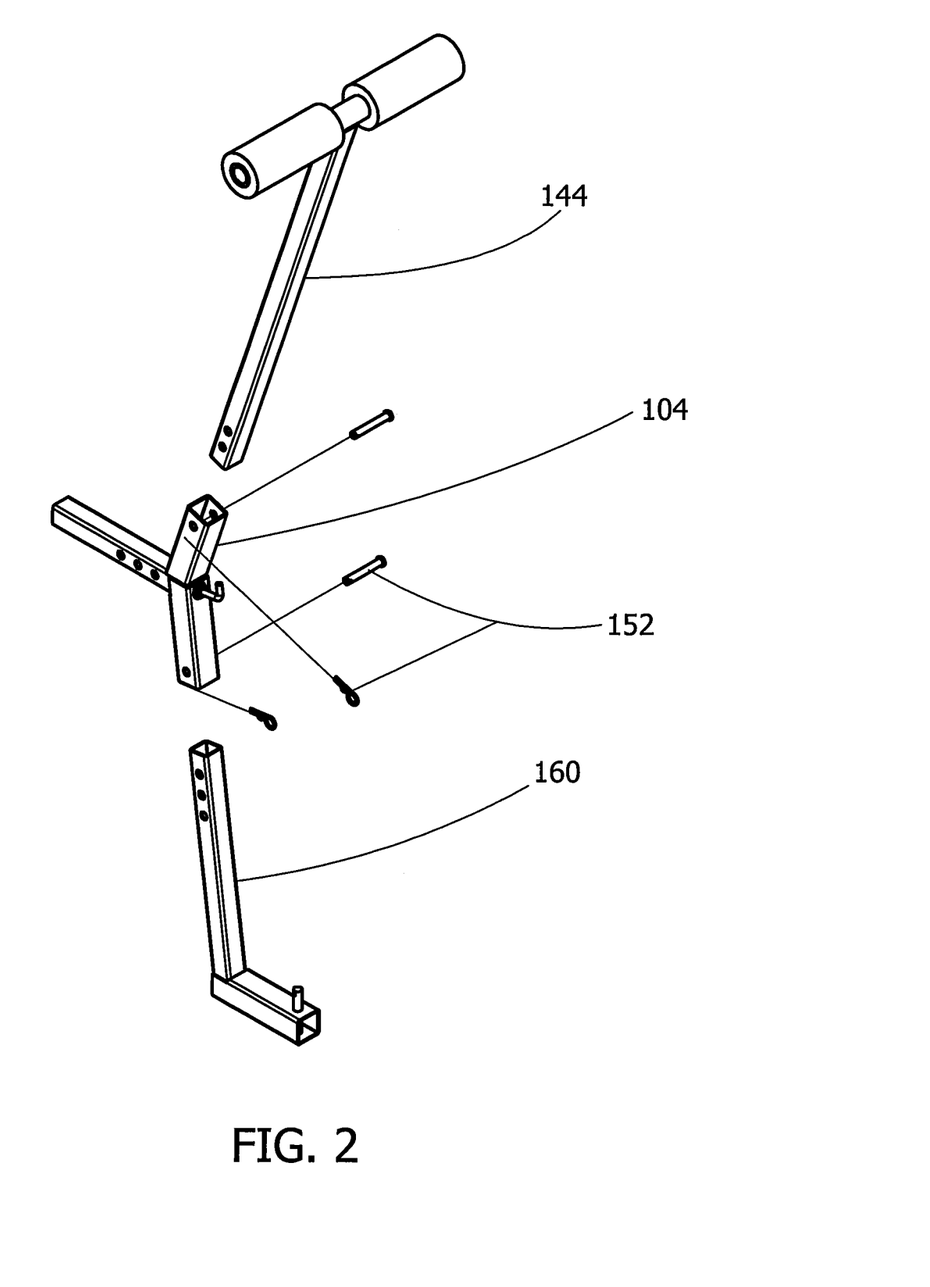
FIG. 2 illustrates an exploded perspective view of a frame assembly of the platform device in accordance with the disclosed architecture.
Figure 3:
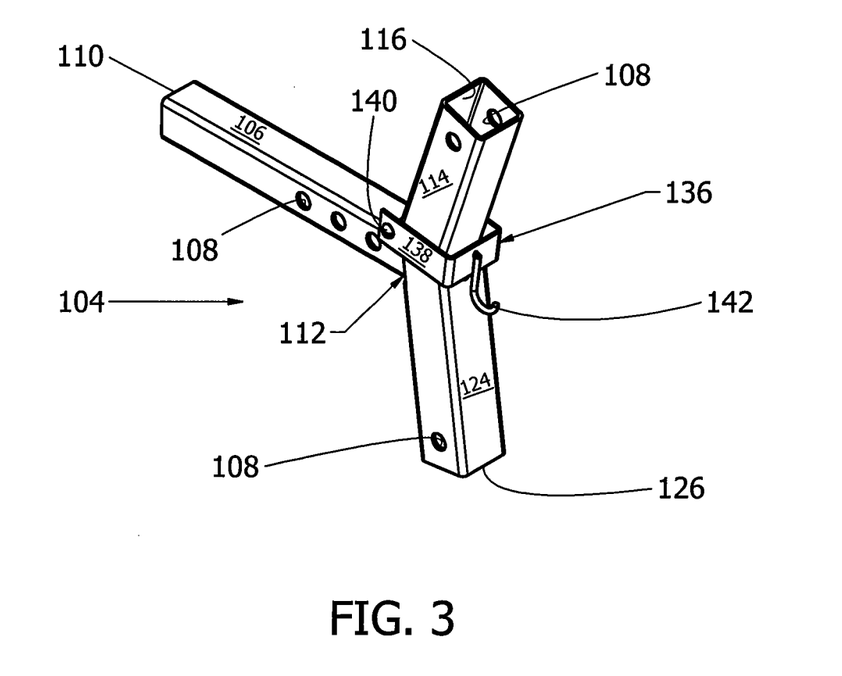
FIG. 3 illustrates an adaptor component of the frame assembly of the platform device in accordance with the disclosed architecture.

As seen in FIGS. 2 and 3, the frame assembly 102 comprises an adaptor component 104, a handle component 144, and a platform hitch component 160. The adaptor component 104 and the platform hitch component 160 substantially form a Z-hitch (not shown); however any hitch design known to one of skill in the art could also be used. The adaptor component 104 comprises a first arm 106, a second arm 114, and a third arm 124 which are preferably welded together for strength and stability. However, any method of attachment, such as bolts, rivets, screws, fasteners, and the like may be used without deviating from the scope of the invention. Unless otherwise stated herein, the structure the frame assembly 102 is preferably comprised of 14 gauge steel tubing generally square in cross-section with metal fasteners, though it is contemplated that other materials such as metals, metal alloys, plastic, and the like, in other shapes, such as rectangular or round in cross-section could also be used without affecting the overall scope of the invention.

The first arm 106 comprises a plurality of through holes 108, a first open end 110, and a first welded end 112. The first arm 106 comprises square-shaped tubing and is substantially 8 inches in length. The square-shaped tubing is desirable as it is lightweight and provides stability against rotational forces. The plurality of through holes 108 on the first arm 106 preferably number 3, and are substantially $3/8^{th}$ inches in diameter centered laterally at intervals of approximately 4, 5, and 6 inches inward from the first open end 110.

To attach the platform device 100 to the personal assistive mobility device 280, the user simply slides the first open end 110 into a receiving hitch (not shown) commonly found on the rear end portion 282 of the personal assistive mobility device 280. The receiving hitch is typically $1\tfrac{1}{4}^{th}$ inch square tubing with a through hole designed to accept a variety of aftermarket attachment devices such as an umbrella, a basket, and the like. If the receiving hitch does not come with the personal assistive mobility device 280, one may be purchased separately and easily attached. The distance between the platform device 100 and the personal assistive mobility device 280 is adjustable in that first arm 106 may be adjusted substantially horizontally and fixed at a plurality of intervals that correspond to the plurality of through holes 108. Once a desired position is obtained, the first arm 106 is secured to the receiving hitch with a securing element 152. The securing element 152 preferably comprises a $3/8^{th}$ inch by 2 inch pin that engages one of the plurality of through holes 108 and is in turn secured with a hairpin lock; however any securing system known to one of skill in the art such as a cotter pin, a clip, a bolt, and the like, may be used without affecting the overall scope of the invention.

The second arm 114 is preferably $1\tfrac{1}{4}^{th}$ inch square tubing comprising a second open end 116 and a second welded end 120. A through hole 108 substantially $3/8^{th}$ of an inch in diameter centered laterally is located approximately between $\tfrac{1}{2}$ and 1 inch from the second open end 116. The second welded end 120 is cut off at an approximately 15 to 20 degree angle and is welded or otherwise attached to the first arm 106 so that the second open end 116 is angled slightly away from the personal assistive mobility device 280 when the frame assembly 102 is attached.

The third arm 124 is preferably $1\tfrac{1}{4}^{th}$ inch square tubing comprising a third open end 126 and a third welded end 132. A through hole 108 substantially $3/8^{th}$ inches in diameter centered laterally is located approximately between $\tfrac{1}{2}$ and 1 inches from the third open end 126. The third welded end 132 comprises a notch 130 approximately $7/8^{th}$ inches long and $1/8^{th}$ inch deep cut into one of the sides. The third welded end 132 is then slid over and welded or otherwise attached to the first welded end 112 of the first arm 106 so that the notch 130 faces the personal assistive mobility device 280 and the third arm 124 angles slightly away at approximately between 5 and 10 degrees from the vertical axis.

Figure 3A:
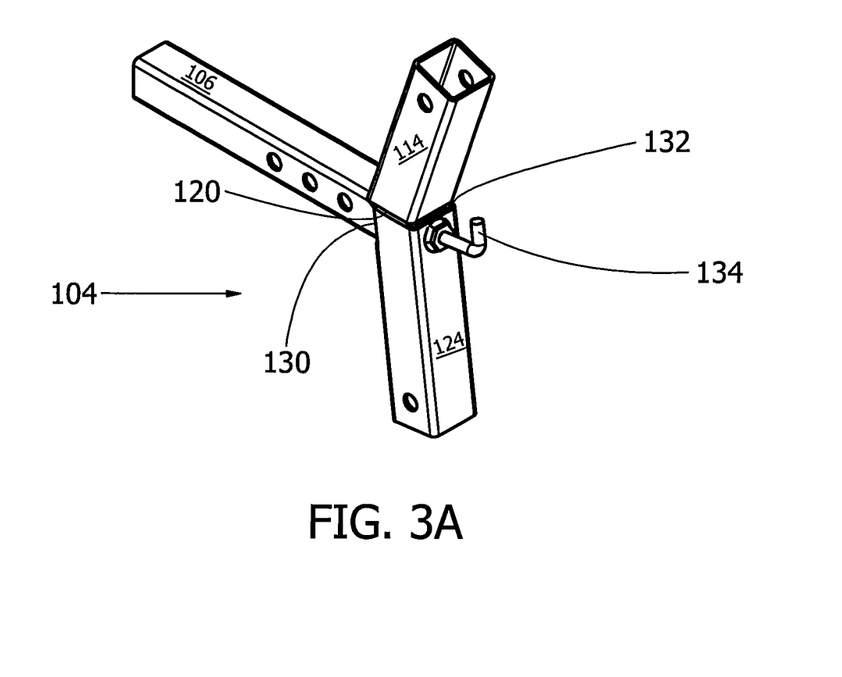
FIG. 3A illustrates a platform hook assembly of the platform device in accordance with the disclosed architecture.

A platform attachment element 134 is securable to the adaptor component 104 near the first welded end 112. Preferably, as seen in FIG. 3, the platform attachment 134 comprises a platform hook assembly 136. The platform hook assembly 136 comprises a bracket element 138, a securing mechanism 140, and a hook element 142. The bracket element 138 is typically U-shaped steel stock measuring approximately $1/16$ inches thick, $3/4^{th}$ inches in height, and $5\tfrac{3}{8}^{th}$ inches long bent into a U-shape with two open ends. The securing mechanism 140 is generally a number 10 nut and bolt penetrating a through hole 108 in each of the two open ends and held in place by the nut, pin, or other securing device. The hook element 142 is typically $1/8^{th}$ inch diameter steel bar stock shaped into a hook shape and welded to a closed end of the bracket element 138. The platform hook assembly 136 simply slides in place over the second arm 114 and is slideably secured in place. As illustrated in FIG. 3A, the platform attachment element 134 may also comprise a hook 134 facing upward toward the handle component 144 that is welded in place or otherwise attached by methods discussed supra.

Figure 4:
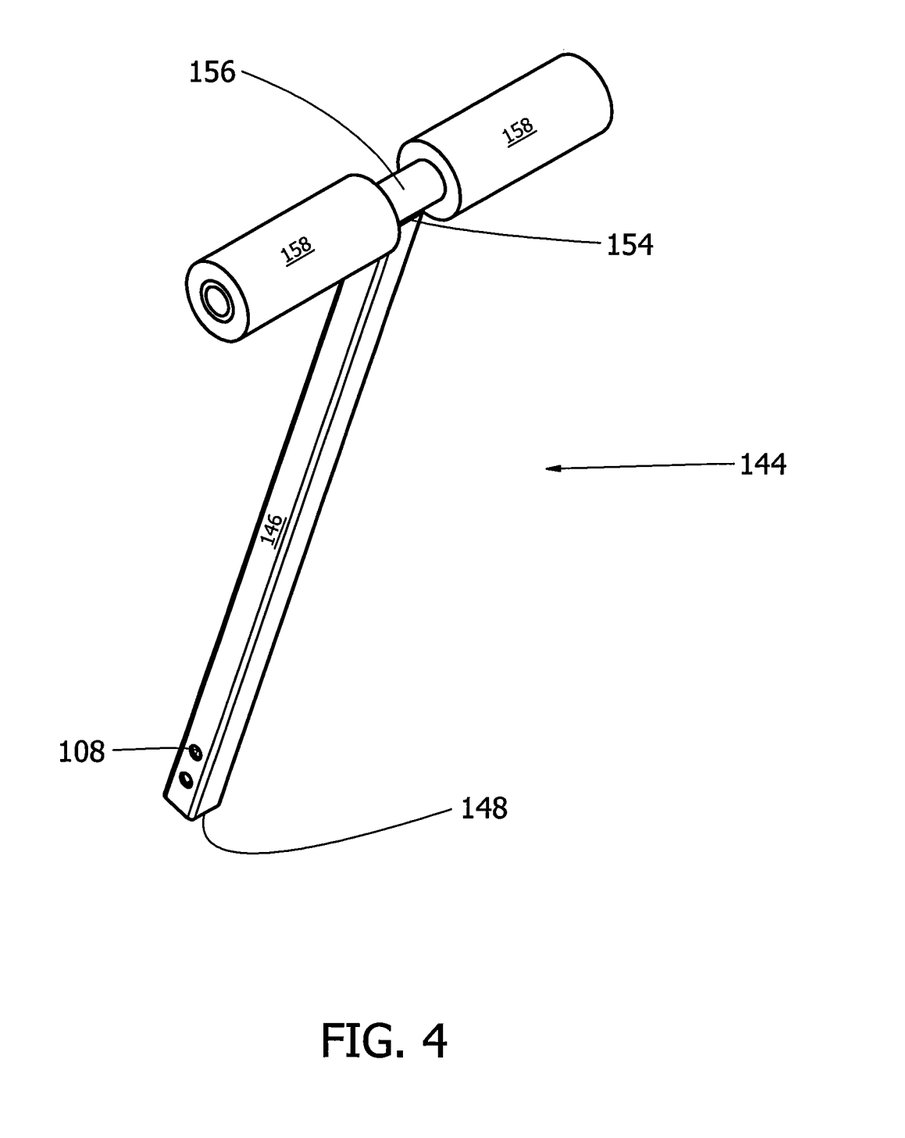
FIG. 4 illustrates a handle portion of the frame assembly of the platform device in accordance with the disclosed architecture.

FIG. 4 illustrates the handle component 144 which comprises a handle leg element 146 and a handle bar element 156. The handle leg element 146 is typically 1 inch square tubing between 18 and 25 inches in length, but is preferably 21.5 inches long. The handle leg element 146 comprises a first handle end 148 and a second handle end 154. Two through holes 108 substantially $3/8^{th}$ inches in diameter centered laterally are located approximately 1 and 2 inches from the first handle end 148.

The handle bar element 156 is typically $3/4^{th}$ inch diameter round metal conduit pipe approximately 12 inches in length. However this is not meant as a limitation as other materials of different dimensions known to one of skill in the art may be used as well. The handle bar element 156 is substantially centered on and welded or otherwise attached to the second handle end 154 oriented approximately perpendicularly to the first arm 106 of the adaptor component 104. Additionally, a plurality of hand grip elements 158, for example but not limited to, ½ inch foam rubber or a plastic molded hand grip, may be affixed to the handle bar element 156 at either end.

As the platform device 100 is adjustable to fit a user of varying height, the handle component 144 is slideably adjustable in length when engaged with the adapter component 104. The first handle end 148 slides into the second open end 116 of the second arm 114 so that the plurality of through holes 108 match up at a desired height. In other words, the handle component 144 is extendable and retractable, and is approximately perpendicular to the first arm 106 when attached. Preferably the handle component 144 is angled between 15 and 20 degrees away from the personal assistive mobility device 280 when attached. To secure at the desired height, the securing element 152 (as seen in FIG. 2) as discussed supra is employed.

Figure 5:
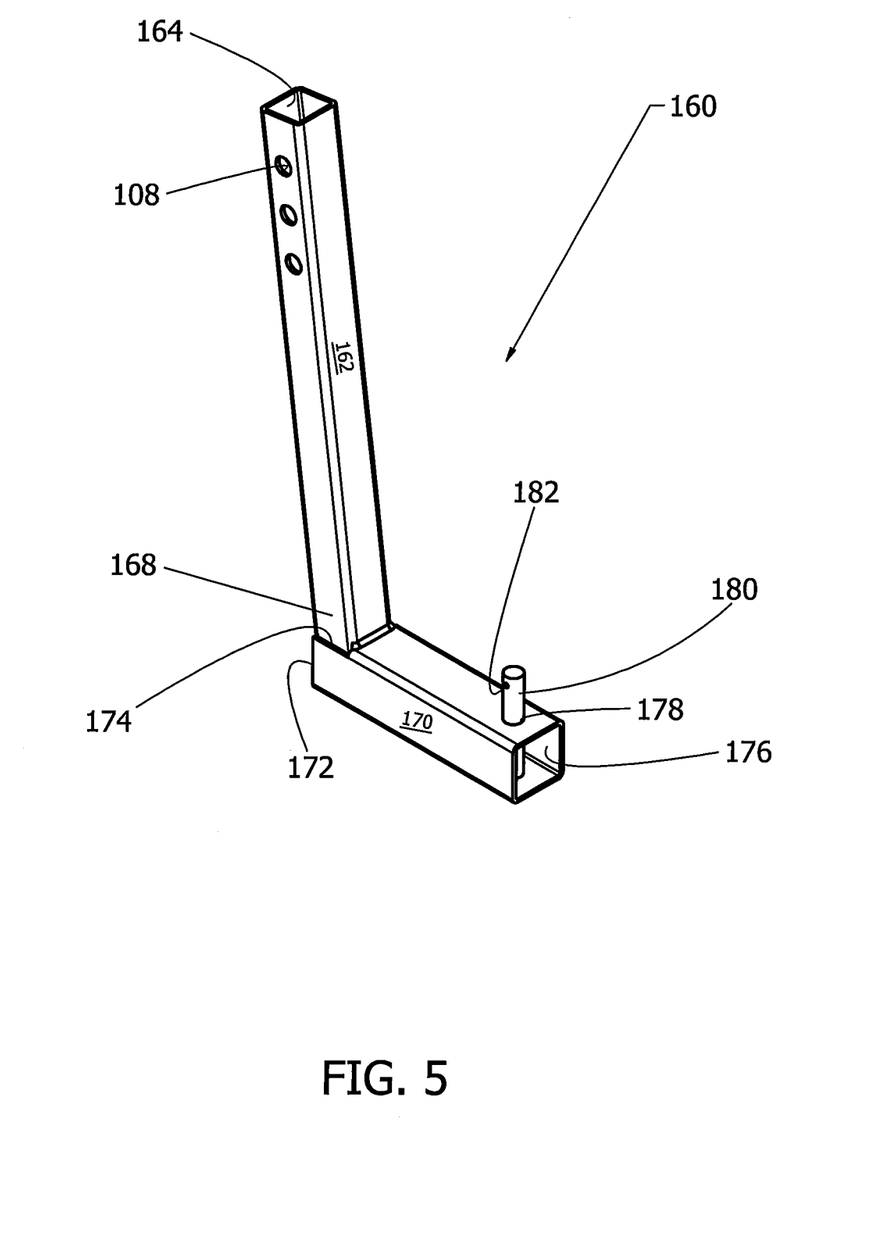
FIG. 5 illustrates a platform hitch portion of the frame assembly of the platform device in accordance with the disclosed architecture.

As seen in FIG. 5, the platform hitch component 160 comprises a platform hitch leg element 162 and a platform hitch foot element 170. The platform hitch leg element 162 is typically 1 inch square tubing approximately between 11 and 13 inches long and comprises a proximal leg end 164 and a distal leg end 168. The proximal leg end 164 slideably engages the third arm 124 of the adapter component 104. The proximal leg end 164 typically comprises 3 through holes 108 that are approximately $3/8^{th}$ of an inch in diameter and are centered at approximately 1, 2, and 3 inches inward. As in the other slideable connections discussed supra, once at a desired length, the securing element 152 is used to connect the plurality of through holes 108 on both the proximal leg end 164, and the third arm 124 of the adapter component 104 in a substantially perpendicular orientation as discussed supra.

The platform hitch foot element 170 is typically $1¼^{th}$ inch square tubing approximately between 4 and 6 inches in length and is oriented substantially parallel to the ground when in use. The platform hitch foot element 170 comprises a proximal foot end 172 and a distal foot end 176. The proximal foot end 172 comprises a foot notch 174 approximately $7/8^{th}$ inches long and $1/8^{th}$ inch deep cut into one of the sides. The proximal foot end 172 is then slid over and welded to or otherwise attached at a angle of approximately 94 to 110 degrees to the distal leg end 168 so that the notch 130 faces upward and the platform hitch foot element 170 is substantially level with the ground when attached. The distal foot end 176 comprises an approximately $3/8^{th}$ inch peg hole 178 oriented perpendicular to and approximately $5/8^{th}$ of an inch from the distal foot end 176. A peg element 180, approximately $3/8^{th}$ inches in diameter and $2 3/8^{th}$ inches in length is inserted through the peg hole 178 and is welded in place with approximately 1 inch extending vertically. A connector element 182 on the peg element 180, such as a hairpin lock for example, may be used to secure the platform assembly 184 once attached.

Figure 6:
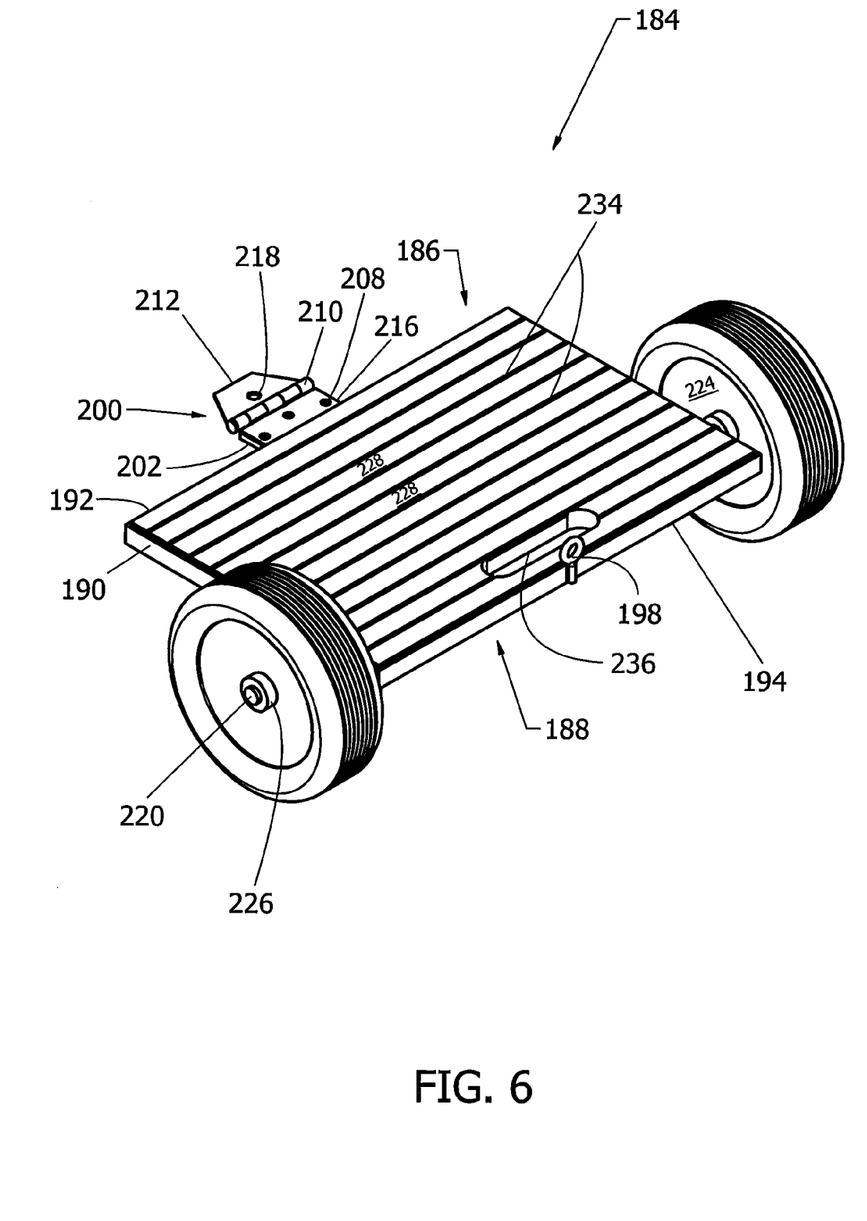
FIG. 6 illustrates a platform assembly of the platform device in accordance with the disclosed architecture.

As illustrated in FIG. 6, the platform assembly 184 comprises a top side 186 and a bottom side 188. The platform assembly 184 further comprises a platform frame element 190, a platform hinge element 200, at least one axle element 220, and a platform body element 228. The platform frame element 190 is substantially an approximately 12 inch by 18 inch rectangular shaped angle iron frame welded together to create an attachment surface for the platform body element 228. In other words, the platform body element 228 rests within the framework of the angle iron. While angle iron is the preferred material for the platform frame element 190, other comparable materials, such as steel or aluminum may be used as well. In addition, the platform frame element 190 dimensions may range from 10 to 30 inches and still be within the scope of the invention.

The platform frame element 190 further comprises a hinge side 192 and a handle side 194. A plurality of attachment holes (not shown) may be placed at intervals around the platform frame element 190 from the top side 186 through the bottom side 188. Preferably, the plurality of attachment holes number between 2 and 8, however any number may be used. Additionally, a hanger element 198 is located approximately at the midpoint of the handle side 194. The hanger element 198 is preferably an approximately ½ inch eyebolt welded in place.

The platform hinge element 200 comprises a base plate portion 202 and a hinge portion 210. The base plate portion 202 is typically $¼^{th}$ inches thick, and is approximately a 3½ by 4 inch rectangular plate welded to the bottom side 188 of the platform frame element 190 approximately centered on the angle iron of the hinge side 192. The base plate portion 202 comprises a hinge facing side (not shown) and a foot plate side (not shown) both of which are approximately ½ inches in width. A plurality of attachment holes 208 penetrate the base plate portion 202. The plurality of attachment holes 208 preferably comprise 4 holes approximately $¼^{th}$ of an inch in diameter located so that 3 are on the hinge facing side, and 1 is on the foot plate side, however, any number of the plurality of attachment holes 208 may be employed in any location that would be useful on the base plate portion 202 that would be useful.

The hinge portion 210 comprises a platform assembly side 212 and a connecting assembly side 216. Typically, the hinge portion 210 may comprise a $3^{1/2}$ inch hinge that may be screwed, bolted, welded, or otherwise fastened to base plate portion 210. Preferably, the platform assembly side 212 is attached with screws that connect to 3 of the plurality of attachment holes 208 located on the hinge facing side. Additionally, the hinge portion 210 is preferably modified so that the connecting assembly side 216 is beveled or cut at an angle of approximately between 25 and 45 degrees to remove a sharp edge. The connecting assembly side 216 further comprises a peg hole 218, approximately between $7/16^{th}$ and $9/16^{th}$ of an inch in diameter, that slideably engages with the peg element 180 of the platform hitch foot assembly 184, thereby selectively connecting the frame assembly 102 to the platform assembly 184 on a pivot point. Once connected, the platform assembly 184 may pivot left or right in a substantially horizontal plane along the peg element 180 allowing the platform device 100 to turn in concert with the personal assistive mobility device 280.

Furthermore, the platform assembly 184 may articulate along the hinge portion 210 in a substantially vertical direction so that the platform assembly 184 may fold up approximately 90 degrees toward the frame assembly 102. The platform assembly 184 may then be held in a folded position by hooking the hanger element 198 to the hook element 142 of the platform hook assembly 136. When so attached, the cross section of the platform device 100 becomes minimized so that the personal assistive mobility device 280 is not substantially restricted from going anywhere it could go without an attachment.

The at least one axle element 220 is preferably a metal rod approximately 24 inches in length and between ½ and $5/8^{th}$ inches in diameter centered approximately 3 inches inward from the handle side 194 of the platform frame element 190. While the at least one axle element 220 is preferably a single axle, additional axles may be added to increase the stability or carrying capacity if desired and still be within the scope of the invention. A plurality of axle element clamps (not shown), typically ⅝th inch hold down straps, or their equivalent, may be used to movably attach the at least one axle element 220 to the platform frame element 190 so that the axle may spin or rotate when attached. A plurality of wheels 224, preferably 2, with a diameter between 6 and 12 inches, may be secured to the at least one axle element 220 with a plurality of wheel securing elements 226, typically a lynch pin or a comparable attachment mechanism.

The platform body element 228 comprises a platform base 228 sized to fit within the dimensions of the platform frame assembly 190, approximately a 11½ by 17½ inches rectangle. The platform body element 228 is typically constructed from wood, though it is contemplated that other materials such as but not limited to metals, plastics, plywood, oriented strand board, waffle board, and the like may be used without affecting the overall scope of the invention. The platform body element 228 is attached to the platform frame assembly 190 and the foot plate side 206 of the base portion 202 of the platform hinge element 220 with fasteners such as bolts, screws, nails, rivets, and the like. Additionally, the platform body element 228 may further comprise a handle hole 238 approximately between 4 and 4 inches long and a non slip surface element 234. For example, a piece of non-skid material may be attached to the platform body element 228 with adhesive to improve traction.

What has been described above includes examples of the disclosed device. It is, of course, not possible to describe every conceivable combination of components and/or methodologies, but one of ordinary skill in the art may recognize that many further combinations and permutations are possible. Accordingly, the novel device is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A platform device for improving mobility that is attachable to a powered personal assistive mobility device, the platform device comprising:
    a frame assembly comprising:
        an adaptor component, wherein the adaptor component comprises a first arm adjustably attachable to a rear portion of the powered personal assistive mobility device, a second arm attachable to the first arm and a third arm attachable to the first arm;
        a handle component attachable to the second arm, wherein the handle component is substantially perpendicular to the first arm and is slideably engaged with the second arm, and
        a platform hitch component attachable to the third arm; and
    a platform assembly attachable to the frame assembly, wherein the platform assembly comprises a hinge element.

2. The platform device of claim 1, wherein the platform hitch component is substantially perpendicular to the first arm and is slideably engaged with the third arm.

3. The platform device of claim 1, wherein the adaptor component further comprises a platform attachment element.

4. The platform device of claim 1, wherein the platform assembly can move vertically and horizontally in relation to the frame assembly.

* * * * *